US010528670B2

(12) United States Patent
Yao et al.

(10) Patent No.: US 10,528,670 B2
(45) Date of Patent: Jan. 7, 2020

(54) AMENDMENT SOURCE-POSITIONING METHOD AND APPARATUS, COMPUTER DEVICE AND READABLE MEDIUM

(71) Applicant: BAIDU ONLINE NETWORK TECHNOLOGY (BEIJING) CO., LTD., Beijing (CN)

(72) Inventors: Shujie Yao, Beijing (CN); Qin Qu, Beijing (CN); Zejin Hu, Beijing (CN)

(73) Assignee: BAIDU ONLINE NETWORK TECHNOLOGY (BEIJING) CO., LTD., Beijing (CN)

(*) Notice: Subject to any disclaimer, the term of this patent is extended or adjusted under 35 U.S.C. 154(b) by 123 days.

(21) Appl. No.: 15/980,261

(22) Filed: May 15, 2018

(65) Prior Publication Data
US 2018/0341640 A1 Nov. 29, 2018

(30) Foreign Application Priority Data

May 25, 2017 (CN) .................. 2017 1 0380472 8

(51) Int. Cl.
*G10L 15/22* (2006.01)
*G06F 17/27* (2006.01)
*G10L 15/26* (2006.01)
(52) U.S. Cl.
CPC ...... *G06F 17/2785* (2013.01); *G06F 17/2705* (2013.01); *G06F 17/2795* (2013.01); *G10L 15/22* (2013.01); *G10L 15/265* (2013.01)
(58) Field of Classification Search
CPC ............. G06F 17/2785; G06F 17/2715; G06F 17/2705; G10L 15/22; G10L 15/1815; G10L 15/08; G10L 15/18; G10L 15/265
(Continued)

(56) References Cited

U.S. PATENT DOCUMENTS 6,604,075 B1 * 8/2003 Brown ................ H04M 3/4938
704/270.1
6,839,669 B1 * 1/2005 Gould ..................... G10L 15/22
704/246

(Continued)

FOREIGN PATENT DOCUMENTS

CN 102207973 A 10/2011
CN 103559220 A 2/2014
(Continued)

OTHER PUBLICATIONS

Chinese Office Action dated Nov. 5, 2019, for related Chinese Appln. No. 201710380472.8; 9 Pages.
(Continued)

*Primary Examiner* — Jakieda R Jackson
(74) *Attorney, Agent, or Firm* — Brooks Kushman PC

(57) ABSTRACT

An amendment source-positioning method and apparatus, a computer device and a readable medium. The method includes: obtaining a first target word identifying an amendment source and defining parameters of the amendment source, from semantic parsing information of a user-input speech error correction instruction; positioning the amendment source from a to-be-corrected text according to the first target word and the defining parameters. As compared with the template matching and positioning scheme employed in the prior art, the technical solution of the present disclosure can support a speech error correction instruction in any form, and exhibits a more flexible amendment source-positioning manner, thereby effectively improving the amendment source-positioning efficiency.

9 Claims, 5 Drawing Sheets

(58) Field of Classification Search
USPC .......................................... 704/9, 235, 251
See application file for complete search history.

(56) References Cited

U.S. PATENT DOCUMENTS

| | | | | |
|---|---|---|---|---|
| 7,383,172 | B1* | 6/2008 | Jamieson | G06F 17/2785 |
| | | | | 704/9 |
| 8,219,407 | B1* | 7/2012 | Roy | G10L 15/19 |
| | | | | 704/275 |
| 9,558,740 | B1* | 1/2017 | Mairesse | G10L 15/08 |
| 9,646,606 | B2* | 5/2017 | Peng | G10L 15/08 |
| 2001/0041980 | A1* | 11/2001 | Howard | G10L 15/1822 |
| | | | | 704/270 |
| 2003/0216912 | A1* | 11/2003 | Chino | G10L 15/22 |
| | | | | 704/231 |
| 2006/0161434 | A1* | 7/2006 | Faisman | G10L 15/22 |
| | | | | 704/246 |
| 2006/0190255 | A1 | 8/2006 | Fukada | |
| 2009/0018829 | A1* | 1/2009 | Kuperstein | G10L 15/26 |
| | | | | 704/235 |
| 2009/0258333 | A1* | 10/2009 | Yu | G09B 5/04 |
| | | | | 434/157 |
| 2013/0191125 | A1 | 7/2013 | Suzuki et al. | |

FOREIGN PATENT DOCUMENTS

| | | |
|---|---|---|
| CN | 103903618 A | 7/2014 |
| CN | 104756183 A | 7/2015 |
| CN | 105739819 A | 7/2016 |
| CN | 106098060 A | 11/2016 |
| CN | 106534548 A | 3/2017 |

OTHER PUBLICATIONS

Chinese Search Report dated Oct. 22, 2019 for related Chinese Appln. No. 201710380472.8; 3 Pages.

* cited by examiner

Example 1.1

Example 1.2

Example 1.3

AMENDMENT SOURCE-POSITIONING METHOD AND APPARATUS, COMPUTER DEVICE AND READABLE MEDIUM

The present application claims the priority of Chinese Patent Application No. 2017103804728, filed on May 25, 2017, with the title of "Amendment source-positioning method and apparatus, computer device and readable medium". The disclosure of the above applications is incorporated herein by reference in its entirety.

FIELD OF THE DISCLOSURE

The present disclosure relates to the technical field of computer application, and particularly to an amendment source-positioning method and apparatus, a computer device and a readable medium.

BACKGROUND OF THE DISCLOSURE

In the prior art, to better facilitate the user's use of an application App, many applications all support speech input. As such, the user only needs to input speech data to the App upon use, operations are simple and use is convenient.

For example, when the user edits a text, the App may receive a user-input speech error-correcting instruction, then precisely position an amendment source in the to-be-amended text according to semantic parsing information of the user's speech error-correcting instruction, and subsequently perform error correction for the text. In the prior art, it is feasible to employ a template matching and positioning method to position the amendment source from the semantic parsing information of the speech error-correcting instruction according to a preset amendment source-positioning module.

However, the template matching and positioning method in the prior art can only support limited specific templates. The amendment source-positioning manner is rigid and inflexible, and the amendment source-positioning efficiency is lower.

SUMMARY OF THE DISCLOSURE

The present disclosure provides an amendment source-positioning method and apparatus, a computer device and a readable medium, to enrich flexibility of amendment source positioning and improve the amendment source positioning efficiency.

The present disclosure provides an amendment source-positioning method, the method comprising:

obtaining a first target word identifying an amendment source and defining parameters of the amendment source, from semantic parsing information of a user-input speech error correction instruction;

positioning the amendment source from a to-be-corrected text according to the first target word and the defining parameters.

Further optionally, in the method, the positioning the amendment source from a to-be-corrected text according to the first target word and the defining parameters specifically comprises:

looking up the to-be-corrected text for the first target word according to the defining parameters;

if the first target word is found, determining that the amendment source is positioned, and return position information of the amendment source.

Further optionally, the method further comprises:

if the first target word is not found from the to-be-corrected text, performing text fuzzy positioning for the first target word from the to-be-corrected text according to the defining parameters.

Further optionally, in the method, the performing text fuzzy positioning for the first target word from the to-be-corrected text according to the defining parameters specifically comprises:

performing synonymy transformation for the first target word to obtain a second target word;

looking up the to-be-corrected text for the second target word according to the defining parameters;

if the second target word is found, determining that the amendment source is positioned, and returning position information of the amendment source.

Further optionally, in the method, the performing text fuzzy positioning for the first target word from the to-be-corrected text according to the defining parameters specifically comprises:

performing similarity transformation for the first target word to obtain a third target word, wherein a proportion of an editing distance between the third target word and the first target word to a maximum editing distance of the first target word is smaller than or equal to a preset editing distance proportion threshold;

looking up the to-be-corrected text for the third target word according to the defining parameters;

if the third target word is found, determining that the amendment source is positioned, and returning position information of the amendment source.

Further optionally, the method further comprises:

if the amendment source is not positioned in text fuzzy positioning, performing phonetic notation fuzzy positioning for the first target word from the to-be-corrected text according to the defining parameters.

Further optionally, in the method, the performing phonetic notation fuzzy positioning for the first target word from the to-be-corrected text according to the defining parameters specifically comprises:

performing real phonetic notation for each character in the first target word;

expanding confusing phonetic notation for characters with confusing pronunciation, according to the real phonetic notation of characters in the first target word;

generating a corresponding phonetic notation set of the characters, according to the real phonetic notation and confusing phonetic notation of respective characters in the first target word;

looking up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;

if the first suspicious target word is found, determining that the amendment source is positioned, and returning position information of the amendment source;

otherwise, further looking up the to-be-corrected text for a second suspicious target word in order of the characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold;

if the second suspicious target word is found, determining that the amendment source is positioned, and returning position information of the amendment source.

Further optionally, in the method, the defining parameters include at least one parameter class among actual position, relative position, coverage scope, relative position-associated word and descriptive word;

furthermore, the positioning the amendment source from a to-be-corrected text according to the first target word and the defining parameters specifically comprises:

obtaining a corresponding locater according to parameter classes included by the defining parameters;

sending the first target word and the defining parameters to the locater, the locater positioning the amendment source from the to-be-corrected text according to the first target word and the defining parameters.

The present disclosure provides an amendment source-positioning apparatus, the apparatus comprising:

an obtaining module configured to obtain a first target word identifying an amendment source and defining parameters of the amendment source, from semantic parsing information of a user-input speech error correction instruction;

a positioning module configured to position the amendment source from a to-be-corrected text according to the first target word and the defining parameters.

Further optionally, in the apparatus, the positioning module is specifically configured to:

look up the to-be-corrected text for the first target word according to the defining parameters;

if the first target word is found, determine that the amendment source is positioned, and return position information of the amendment source.

Further optionally, in the apparatus, the positioning module is specifically configured to, if the first target word is not found from the to-be-corrected text, perform text fuzzy positioning for the first target word from the to-be-corrected text according to the defining parameters.

Further optionally, in the apparatus, the positioning module is specifically further configured to:

perform synonymy transformation for the first target word to obtain a second target word;

look up the to-be-corrected text for the second target word according to the defining parameters;

if the second target word is found, determine that the amendment source is positioned, and return position information of the amendment source.

Further optionally, in the apparatus, the positioning module is specifically further configured to:

perform similarity transformation for the first target word to obtain a third target word, wherein a proportion of an editing distance between the third target word and the first target word to a maximum editing distance of the first target word is smaller than or equal to a preset editing distance proportion threshold;

look up the to-be-corrected text for the third target word according to the defining parameters;

if the third target word is found, determine that the amendment source is positioned, and return position information of the amendment source.

Further optionally, in the apparatus, the positioning module is specifically further configured to, if the amendment source is not positioned in text fuzzy positioning, perform phonetic notation fuzzy positioning for the first target word from the to-be-corrected text according to the defining parameters.

Further optionally, in the apparatus, the positioning module is specifically further configured to, perform real phonetic notation for each character in the first target word;

expand confusing phonetic notation for characters with confusing pronunciation, according to real phonetic notation of characters in the first target word;

generate a corresponding phonetic notation set of the characters, according to the real phonetic notation and confusing phonetic notation of respective characters in the first target word;

look up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;

if the first suspicious target word is found, determine that the amendment source is positioned, and return position information of the amendment source;

otherwise, further look up the to-be-corrected text for a second suspicious target word in order of the characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold;

if the second suspicious target word is found, determine that the amendment source is positioned, and return position information of the amendment source.

Further optionally, in the apparatus, the defining parameters include at least one parameter class among actual position, relative position, coverage scope, relative position-associated word and descriptive word;

furthermore, the positioning module is further specifically configured to:

obtain a corresponding locater according to parameter classes included by the defining parameters;

send the first target word and the defining parameters to the locater, the locater positioning the amendment source from the to-be-corrected text according to the first target word and the defining parameters.

The present disclosure further provides a computer device, comprising:

one or more processors, a memory for storing one or more programs, the one or more programs, when executed by said one or more processors, enabling said one or more processors to implement the above-mentioned amendment source-positioning method.

The present disclosure further provides a computer readable medium on which a computer program is stored, the program, when executed by a processor, implementing the above-mentioned amendment source-positioning method.

According to the amendment source-positioning method and apparatus, the device and the readable medium of the present disclosure, the first target word identifying the amendment source and defining parameters of the amendment source are obtained from semantic parsing information of a user-input speech error correction instruction; the amendment source is positioned from the to-be-corrected text according to the first target word and the defining parameters of the amendment source. As compared with the template matching and positioning scheme employed in the prior art, the scheme of the present embodiment can support a speech error correction instruction in any form, and exhibits a more flexible amendment source-positioning manner, thereby effectively improving the amendment source-positioning efficiency.

DETAILED DESCRIPTION OF PREFERRED EMBODIMENTS

The present disclosure will be described in detail in conjunction with figures and specific embodiments to make objectives, technical solutions and advantages of the present disclosure more apparent.

Figure 1:
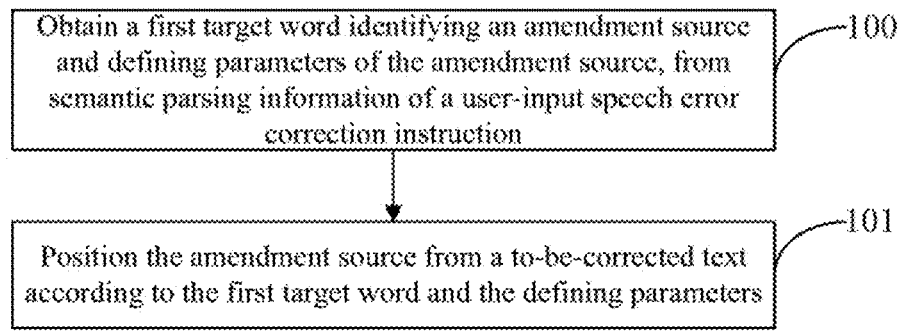
FIG. 1 is a flow chart of a first embodiment of an amendment source-positioning method according to the present disclosure.

FIG. 1 is a flow chart of a first embodiment of an amendment source-positioning method according to the present disclosure. As shown in FIG. 1, the amendment source-positioning method according to the present embodiment may specifically include the following steps:

100: obtaining a first target word identifying an amendment source and defining parameters of the amendment source, from semantic parsing information of a user-input speech error correction instruction;

A subject for executing the amendment source-positioning method of the present embodiment is an amendment source-positioning apparatus. The amendment source-positioning apparatus of the present embodiment is applied to an application or platform that supports speech input. Specifically, the amendment source-positioning apparatus may receive the user-input speech error correction instruction, and parses the speech error correction instruction into semantic parsing information in the form of a text. Alternatively, the application or platform in which the amendment source-positioning apparatus is embedded receives the user-input speech error correction instruction, and parses the user-input speech error correction instruction to obtain the semantic parsing information in the form of a text. Then, the amendment source-positioning apparatus positions the amendment source according to the semantic parsing information. In the present embodiment, the user-input speech error correction instruction may specifically include the amendment source. However, a parsing error inevitably occurs when semantic parsing is performed, the first target word included by the semantic parsing information obtained after parsing the speech error correction instruction is per se used to identify the amendment source, or, put it another way, describe the amendment source. However, if the first target word correctly identifiers the amendment source, the first target word is equal to the amendment source; if there is a parsing error, the first target word cannot correctly identify the amendment source, whereupon the first target word is not equal to the amendment source. Hence, in the present embodiment, the first target word included by the semantic parsing information can only identify the amendment source, and is not certainly equal to the amendment source.

The defining parameters of the amendment source in the present embodiment may include many classes of parameters that are specifically used to describe the amendment source, and facilitate determination of the position of the amendment source. For example, the defining parameters of the amendment source may include at least one parameter class among an actual position of the amendment source, a relative position of the amendment source, a coverage scope of the amendment source, a relative position-associated word of the amendment source and a descriptive word of the amendment source. For example, the user's speech error correction instruction may be "amend the word "zu" in "zu zhuang" after "wo men" to word "zu" in "zu zong"" (Chinese expression: 将 (jiang) 第 (di) 一 (yi) 个 (ge) 我 (wo) 们 (men) 之 (zhi) 后 (hou) 的 (de) 组 (zu) 装 (zhuang) 的 (de) 组 (zu) 字 (zi) 修 (xiu) 改 (gai) 为 (wei) 祖 (zu) 宗 (zong) 的 (de) 祖 (zu) 字 (zi)), "amend the fifth word to "lan"" (Chinese expression: 把 (ba) 第 (di)5(wu) 个 (ge) 字 (zi) 改 (gai) 成 (cheng) 蓝 (lan)), "add "bu hao" after "ni"" (Chinese expression: 在 (zai) 你 (ni) 后 (hou) 加 (jia) 个 (ge) 不 (bu) 好 (hao)) or the like. All error correction instructions include an error correction intention, namely, add, amend or delete. The technical solution of the present embodiment is mainly used to position the amendment source with the error correction intention being "amend". In addition to the error correction intention, the error correction intention may further include classes of defining parameters of the amendment source, as shown in the following Table 1 which illustrates five classes of defining parameters of the amendment source and the first target word identifying the amendment source.

TABLE 1

| Name of attributes | Value | Remarks |
|---|---|---|
| Actual position actual_pos | number | An actual position of a to-be-operated word; for example in "amend the fifth word to "lan"", the value of actual_pos is 5 |
| Relative position relative_pos | Before, after, First, last | A relative position of the to-be-operated word; for example, in "add "bu hao" after "ni"", the value of relative_pos is after; |

TABLE 1-continued

| Name of attributes | Value | Remarks |
| --- | --- | --- |
| A coverage scope and the number ope_word_num | number | For example, the number 1 may be used to represent all; for example, the value "3" is taken for "first three . . . "; the value 3 may also be taken for "last three . . . "; |
| Relative position-associated word relative_pos_word | word or character | For example, in "amend "lan" of "lan zi" after "ni" to "lan" of "lan tian""(Chinese expression: 把(ba)你(ni)后(hou)的(de)篮(lan)子(zi)的(de)篮(lan)改(gai)成(cheng)蓝(lan)天(tian)的(de)蓝(lan)), the value of relative_pos_word is "ni"; |
| Descriptive word pre_ope_word | word or character | a pre-operation word or character; for example, in "the "non" of "nan jing"", the value of pre_ope_word is "nan jing"; |
| First target word pre_ope_error | word or character | A specific wrong word or character to be amended before operation. |

Figure 2:
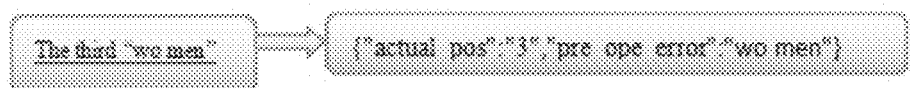
FIG. 2 is an example diagram of defining parameters of three amendment sources according to the present disclosure.
Figure 2:
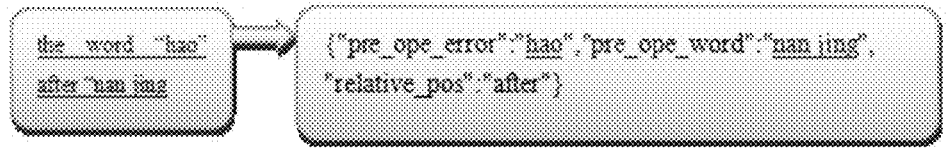
Figure 2:
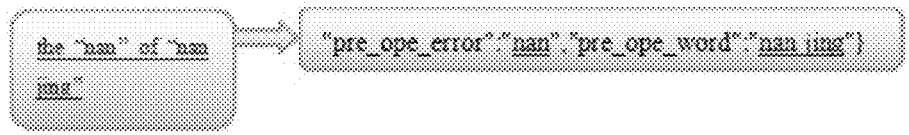

For example, FIG. 2 is an example diagram of defining parameters of three amendment sources according to the present disclosure. It may be known from the description of classes of defining parameters of the above amendment source that in Example 1.1, in "the third "wo men"" (chinese expression: 第(di)三(san)个(ge)我(wo) 们(men)), the actual position actual_pos is 3, and the first target word pre_ope_error is "wo men". In Example 1.2, in "the word "hao" after "nan jing"" (chinese expression: 南(nan)京(jing)后(hou)面(mian)的(de)好(hao)), the first target word pre_ope_error is "hao", the descriptive word pre_ope_word is "nan jing", and the relative position relative_pos is after. In Example 1.3, in "the "nan" of "nan jing"" ((chinese expression: 南京的南), the first target word pre_ope_error is "nan", and the descriptive word pre_ope_word is "nan jing". As for the semantic parsing of other speech error correction instructions, defining parameters of the amendment source may be obtained from the semantic parsing according to definitions of the defining parameters.

101: positioning the amendment source from a to-be-corrected text according to the first target word and the defining parameters of the amendment source.

Since the defining parameters of the amendment source are used to define the amendment source and the first target word is used to identify the amendment source, the amendment source in the to-be-corrected text may be positioned according to the first target word and the defining parameters of the amendment source.

In the amendment source-positioning method of the present embodiment, the first target word identifying the amendment source and defining parameters of the amendment source are obtained from semantic parsing information of a user-input speech error correction instruction; the amendment source is positioned from the to-be-corrected text according to the first target word and the defining parameters of the amendment source. As compared with the template matching and positioning scheme employed in the prior art, the scheme of the present embodiment can support a speech error correction instruction in any form, and exhibits a more flexible amendment source-positioning manner, thereby effectively improving the amendment source-positioning efficiency.

Figure 3:
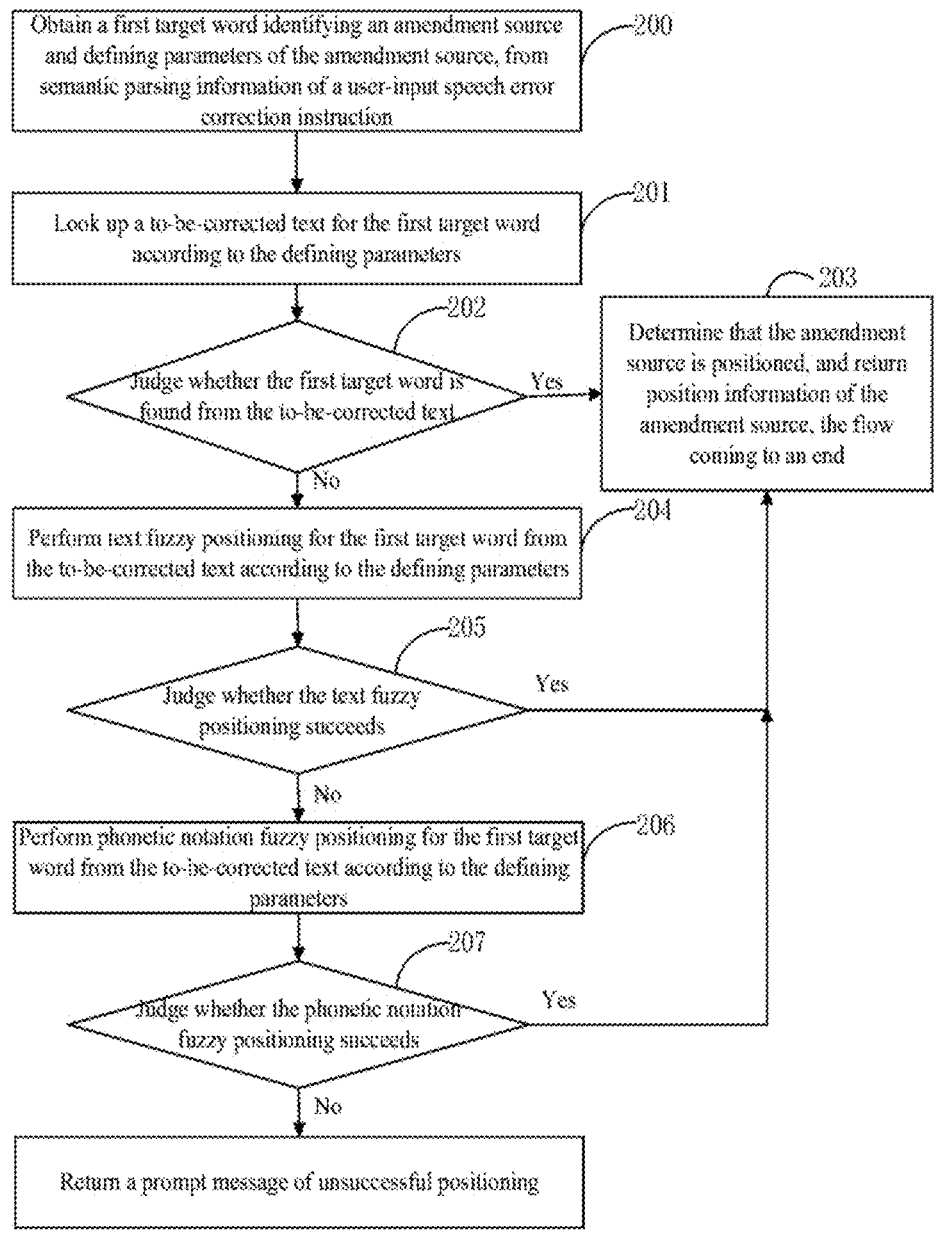
FIG. 3 is a flow chart of a second embodiment of an amendment source-positioning method according to the present disclosure.

FIG. 3 is a flow chart of a second embodiment of an amendment source-positioning method according to the present disclosure. As shown in FIG. 3, the amendment source-positioning method of the present embodiment may specifically include the following steps:

200: obtaining a first target word identifying an amendment source and defining parameters of the amendment source, from semantic parsing information of a user-input speech error correction instruction;

201: looking up a to-be-corrected text for the first target word according to the defining parameters;

202: judging whether the first target word is found from the to-be-corrected text, and, if yes, executing step 203; if no, executing step 204;

203: determining that the amendment source is positioned, and returning position information of the amendment source, the flow coming to an end.

The amendment source positioned at this time is equal to the first target word. The successful positioning of the amendment source indicates successful positioning. At this time, the position information of the amendment source may be returned. For example, the position information of the amendment source of the present embodiment may be structuralized position information. After the position information of the amendment source is positioned, the position information of the amendment source is returned, and subsequently the amendment is performed according to the position information of the amendment source.

204: performing text fuzzy positioning for the first target word from the to-be-corrected text according to the defining parameters; performing step 205;

205: judging whether the text fuzzy positioning succeeds, and performing step 203 if the positioning succeeds; performing step 206 if the positioning fails;

In the present embodiment, when the text fuzzy positioning for the first target word from the to-be-corrected text succeeds, the amendment source is not equal to the first target word.

Specifically, the step of performing text fuzzy positioning for the first target word from the to-be-corrected text according to the defining parameters may specifically include the following two manners:

The first manner is performing text fuzzy positioning after performing synonymy transformation for the first target word. At this time, step 204 may specifically include the following steps:

(a1) performing synonymy transformation for the first target word to obtain a second target word;

(a2) looking up the to-be-corrected text for the second target word according to the defining parameters; if the second target word is found, the text fuzzy positioning succeeds, and performing step 203; if the second target word is not found, the text fuzzy positioning fails, and continuing to perform step 206.

At this time, step 203 relates to determining what is positioned is the amendment source including the second target word, and returning the position information of the amendment source. That is to say, the second target word is equal to the amendment source at this time.

In the present embodiment, when the to-be-corrected text is inconsistent with content of the first target word to be positioned, the content of the first target word is subjected to synonymy transformation for matching. For example, the synonymy transformation in the present embodiment may comprise perform full width-half width transformation for special symbols and numbers. For example, full width is transformed into half width, or half width is transformed into full width. The transformation may include word-symbol transformation, number transformation, omission of punctuation marks and the like. For example, a text number "one hundred (chinese expression: 一 (yi) 百 (bai))" is transformed into Arabic number "100"; all of these transformations do not change the meaning of the first target word, so are collectively called synonymy transformations. The target word after the transformation is called the second target word. At this time, the to-be-corrected text is looked up for the second target word according to the defining parameters; if the second target word is found, this indicates that what is positioned is the amendment source including the second target word, the positioning succeeds, and at the time the position information of the amendment source is returned. Otherwise, it is feasible to perform synonymy transformation for the first target word again, and determine that the positioning fails if the amendment source is not yet positioned after all synonymy transformations are completed for the first target word, and then perform step 206.

The second manner is performing similarity transformation for the first target word, obtaining a third target word and then performing text fuzzy positioning.

At this time, step 204 may specifically comprise the following steps:

(b1) performing similarity transformation for the first target word to obtain the third target word;

(b2) looking up the to-be-corrected text for the third target word according to the defining parameters; if the third target word is found, the text fuzzy positioning succeeds, and performing step 203; if the third target word is not found, the text fuzzy positioning fails, and continuing to perform step 206.

At this time, step 203 relates to determining what is positioned is the amendment source including the third target word, and returning the position information of the amendment source. That is to say, the third target word is equal to the amendment source at this time.

A proportion of an editing distance between the third target word and the first target word to a maximum editing distance of the first target word is smaller than or equal to a preset editing distance proportion threshold. The maximum editing distance of the first target word may be a distance for amending the whole of the first target word. If the first target word includes five characters, the maximum editing distance is 5. If the first character in the first target word is amended, the corresponding editing distance is 1; if two characters in the first target word are amended, the corresponding editing distance is 2, and so on so forth. That is to say, the similarity transformation of the present embodiment allows for little editing for the first target word to obtain the third target word. However, a proportion of the editing distance to the maximum editing distance of the first target word must be smaller than or equal to a preset editing distance proportion threshold, otherwise the third target word after the amendment is not recognized. Then, it is possible to look up the to-be-corrected text for the third target word according to the defining parameters; if the third target word is found, determine that the amendment source is positioned, and return the position information of the amendment source. Otherwise, it is feasible to perform similarity transformation for the first target word again, and determine that the positioning fails if the amendment source is not yet positioned after all similarity transformations are completed for the first target word, and then perform step 206.

In the present embodiment, it is possible to perform similarity transformation through the editing distance, and position a similar text, and recall cases in which the same content is recognized as different texts due to semantic recognition and cases in which the user makes amendments through the similar text. For example, upon similarity transformation, "7748" may be amended to "7788". It is achievable to position the amendment source in the case of satisfying the preset editing distance proportion threshold, and return structuralized position information of the amendment source, thereby improving a recall rate while ensuring an accuracy.

206: performing phonetic notation fuzzy positioning for the first target word from the to-be-corrected text according to the defining parameters; performing step 207;

207: judging whether the phonetic notation fuzzy positioning succeeds, and performing step 203 if the positioning succeeds; otherwise, returning a prompt message of unsuccessful positioning if the positioning fails.

In the present embodiment, since the first target word is extracted from the semantic parsing information obtained after performing semantic parsing for the user-input speech error correction instruction, and since in speech recognition, the same pronunciation might be recognized into different texts in different contexts, such cases may be recalled through phonetic notation fuzzy positioning. Again for example, some users have certain accents, for example, some user cannot distinguish retroflexes from blade-alveolars, e.g., cannot distinguish "zh" from "z", "sh" from "s", "l" from "n". As a result, the amendment source described in the user-input speech error correction instruction is wrong. In the present embodiment, the phonetic notation fuzzy positioning may be employed to improve the positioning efficiency of the amendment source, increase the information recall rate, and enhance the positioning error-tolerant rate.

For example, the performing phonetic notation fuzzy positioning from the to-be-corrected text according to the defining parameters may specifically include the following steps:

(c1) performing real phonetic notation for each character in the first target word;

(c2) expanding confusing phonetic notation for characters with confusing pronunciation, according to real phonetic notation of characters in the first target word;

The confusing pronunciation in the present embodiment may be phonetic notation of all retroflexes corresponding to phonetic notation of the blade-alveolars, and phonetic notation of blade-alveolars corresponding to phonetic notation of retroflexes.

(c3) generating a corresponding phonetic notation set of the characters, according to the real phonetic notation and confusing phonetic notation of respective characters in the first target word.

It is feasible to, for each character in the first target word, use the real phonetic notation of the character and all confusing phonetic notations of the character to generate a phonetic-notated character of the character. As such, upon subsequent lookup, so long as a certain character matches with one phonetic notation (regardless the real phonetic notation or confusion phonetic notation) of the character in the phonetic notation set, it is believed that the phonetic notation is matched with the character.

(c4) looking up the to-be-corrected text for a first suspicious target word in order of characters in the first target word according to the defining parameters, wherein pronunciation of the characters in the first suspicious target word is matched in turn with the real phonetic notation or confusing phonetic notation in the phonetic notation set of characters at corresponding positions in the first target word; performing step 203 if the first suspicious target word is found; otherwise performing step (c5) if the first suspicious target word is not found.

That is to say, both the first target word and the first suspicious target word include the same number of characters, and the pronunciation of the first character of the first suspicious target word is the same as the real phonetic notation or confusing phonetic notation of the first character in the first target word in the phonetic notation set; likewise, the pronunciation of the second character of the first suspicious target word is the same as the real phonetic notation or confusing phonetic notation of the second character in the first target word in the phonetic notation set; similarly, the pronunciation of the character at each position of the first suspicious target word is the same as the real phonetic notation or confusing phonetic notation of the character at a corresponding position in the first target word in the phonetic notation set. As such, it is feasible to determine that the first suspicious target word is found from the to-be-corrected text.

At this time, step 203 relates to determining that the amendment source including the first suspicious target word is positioned, and returning the structuralized position information of the amendment source. That is to say, the first suspicious target word is equal to the amendment source at this time.

(c5) looking up the to-be-corrected text for a second suspicious target word in order of characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold; performing step 203 if the second suspicious target word is found; otherwise, the positioning is unsuccessful and a prompt message of unsuccessful positioning is returned.

At this time, step 203 relates to determining that the amendment source including the second suspicious target word is positioned, and returning the position information of the amendment source. That is to say, the second suspicious target word is equal to the amendment source at this time.

Specifically, in the present embodiment, it is not the case that not production of each character in the second suspicious target word, as compared with the first suspicious target word, is matched with the real phonetic notation or confusing phonetic notation in the phonetic notation set of characters at corresponding positions in the first target word. In contrast, successful positioning may be confirmed so long as a proportion of the number of matched characters to the total number of characters included in the first target word is larger than or equal to the preset character proportion threshold. The technical solution may be employed to further improve the information recall rate and enhance the amendment source-positioning error-tolerant rate.

According to the amendment source-positioning method according to the present embodiment, the above technical solution may be employed to further employ text fuzzing positioning and phonetic notation fuzzy positioning to achieve the positioning of the amendment source, while looking up the to-be-corrected text for the first target word according to the defining parameters, can further improve the information recall rate, and enhance the amendment source-positioning error-tolerant error while ensuring the positioning accuracy.

Figure 4:
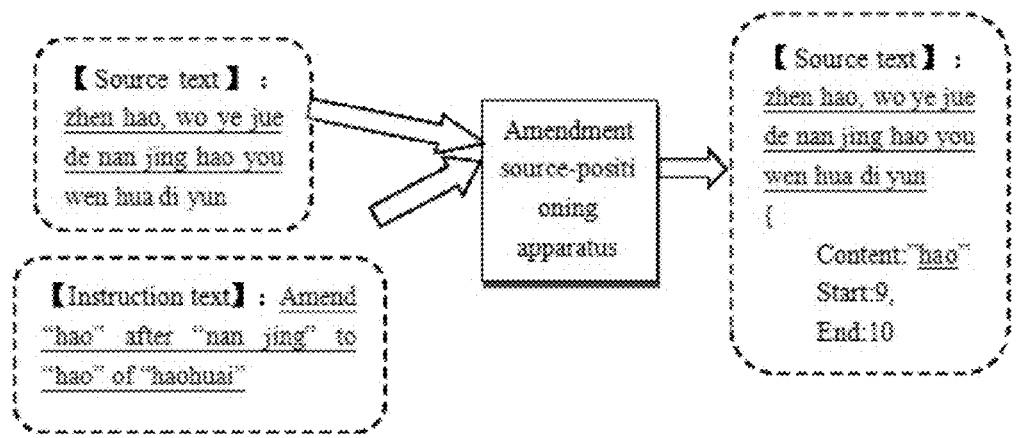
FIG. 4 is a diagram of a use scenario of amendment source positioning according to the present disclosure.

FIG. 4 is a diagram of a use scenario of amendment source positioning according to the present disclosure. FIG. 4 shows an example of the amendment source-positioning method of the present disclosure. An amendment source-positioning apparatus may employ the amendment source-positioning method of embodiments shown in FIG. 1-FIG. 3. Specifically, upon use, the content of a source text may include "zhen hao, wo ye jue de nan jing hao you wen hua di yun" (Chinese expression: 真(zhen)好(hao), 我(wo) 也(ye)觉(jue)得(de)南(nan)京(jing)号(hao)有(you) 文(wen)化(hua)底(di)蕴(yun)). Correspondingly, the semantic parsing information corresponding to the user-input speech error correction instruction, namely, an instruction text, may include "Amend "hao" after "nan jing" to "hao" of "hao huai"" (Chinese expression: 把(ba) "南(nan) 京(jing)" 后(hou)边(bian)的(de) "号(hao)" 改(gai) 成(cheng) "好(hao)坏(hua)" 的(de) "好(hao)"). At this time, the amendment source-positioning apparatus may position the amendment source in the source text according to the instruction text. Details are not provided any more here. Specifically, the positioning of the amendment source may be achieved with reference to the above-mentioned method of embodiments shown in FIG. 1-FIG. 3. No details are provided any more here.

Figure 5:
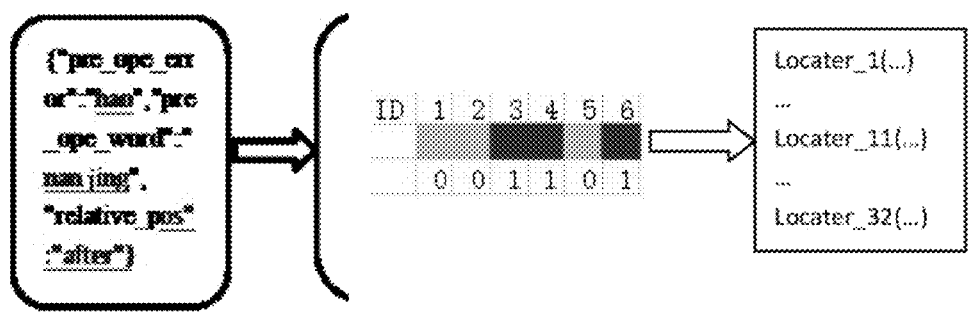
FIG. 5 is a schematic diagram of a flow of amendment source positioning according to the present disclosure.

Further optionally, in the above embodiments, the amendment source-positioning apparatus directly positions the amendment source corresponding to various classes of defining parameters. In practical application, the amendment source-positioning apparatus may further be provided with a plurality of locaters, to perform amendment source positioning respectively with respect to various classes of defining parameters. For example, the defining parameters in the present embodiment may include at least one parameter class among the following five classes: actual position, relative position, coverage scope, relative position-associated word and descriptive word. The speech error correction instruction may include any one, two or more parameter classes. At this time, a total of 2*2*2*2*2=32 defining parameter combinations may be obtained according to the five classes of defining parameters. When locaters are arranged, a locater may be provided for each combination. As such, a total of 32 locators such as Locater_1, Locater_2, . . . Locater_32 may be provided. For example, FIG. 5 is a schematic diagram of a flow of amendment source positioning according to the present disclosure. As shown in FIG. 5, after the amendment source-positioning apparatus obtains respective defining parameters, the five classes of defining parameters may correspondingly be represented with different IDs. For example, in the present embodiment, 1, 2, 3, 4 and 5 are employed to respectively represent the actual position actual_pos, relative position relative_pos, relative position-associated word relative_pos_word, descriptive word pre_ope_word, and coverage scope and number ope_word_num. As shown in FIG. 5, the first target word pre_ope_error is "hao", and the relative position-associated word relative_pos_word and the descriptive word pre_ope_word are "after" and "nan jing" respectively. At this time, corresponding ID3 and ID4 each have a value, so the values may be identified as 1 and 1. At this time, the corresponding Locator_6 may be employed to perform amendment source positioning, i.e., the Locator_6 only handle the positioning of the amendment source having the two classes of defining parameters: the relative position-associated word relative_pos_word and the descriptive word pre_ope_word. In the present embodiment, arrangement of a plurality of locaters may refrain the amendment source-positioning apparatus from positioning all classes of defining parameters with a tedious handling procedure. Selecting different locaters according to different classes of defining parameters may distribute the positioning task, and the operations are very simple. In practical application, when locaters are included, at least two locaters may be arranged, otherwise the setting of locaters is meaningless. Alternatively, the locaters may be arranged in other manners in practical application, for example, it is further possible that the first locater is responsible for performing positioning processing for the amendment source if the first three parameters are included, and the second locater is responsible for performing positioning processing for the amendment source if the last two parameters are included.

That is, step 101 "positioning the amendment source from a to-be-corrected text according to the first target word and the defining parameters of the amendment source" in the above embodiment may specifically include the following steps:

(d1) obtaining a corresponding locater according to parameter classes included by the defining parameters;

(d2) sending the first target word and the defining parameters to the locater, the locater positioning the amendment source from the to-be-corrected text according to the first target word and the defining parameters. Furthermore, the positioning method of each locater in the present embodiment is the same as the embodiments shown in FIG. 1-FIG. 3. Details are not provided any more here. Reference may be made to the abovementioned positioning method according to the embodiment shown in FIG. 1.

Figure 6:
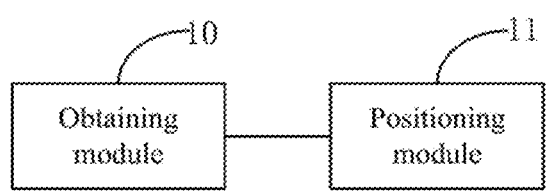
FIG. 6 is a structural diagram of a first embodiment of an amendment source-positioning apparatus according to the present disclosure.

FIG. 6 is a structural diagram of a first embodiment of an amendment source-positioning apparatus according to the present disclosure. As shown in FIG. 6, the amendment source-positioning apparatus in the present embodiment may specifically include an obtaining module 10 and a positioning module 11.

The obtaining module 10 is configured to obtain a first target word identifying an amendment source and defining parameters of the amendment source, from semantic parsing information of a user-input speech error correction instruction;

The positioning module 11 is configured to position the amendment source from a to-be-corrected text according to the first target word and the defining parameters obtained by the obtaining module 10.

Principles employed by the amendment source-positioning apparatus of the present embodiment to implement amendment source positioning with the above modules and the resultant technical effects are the same as those of the above-mentioned method embodiments. For particulars, please refer to the depictions of the aforesaid relevant method embodiments, and no detailed depictions will be presented here.

Further optionally, in the amendment source-positioning apparatus in the present embodiment, the positioning module 11 is specifically configured to:

look up the to-be-corrected text for the first target word obtained by the obtaining module 10 according to the defining parameters obtained by the obtaining module 10;

if the first target word is found, determine that the amendment source is positioned, and return position information of the amendment source.

Further optionally, in the amendment source-positioning apparatus in the present embodiment, the positioning module 11 is specifically configured to, if the first target word obtained by the obtaining module 10 is not found from the to-be-corrected text, perform text fuzzy positioning for the first target word obtained by the obtaining module 10 from the to-be-corrected text according to the defining parameters obtained by the obtaining module 10.

Further optionally, in the amendment source-positioning apparatus in the present embodiment, the positioning module 11 is specifically further configured to:

perform synonymy transformation for the first target word obtained by the obtaining module 10 to obtain a second target word;

look up the to-be-corrected text for the second target word according to the defining parameters obtained by the obtaining module 10;

if the second target word is found, determine that the amendment source is positioned, and return position information of the amendment source.

Further optionally, in the amendment source-positioning apparatus in the present embodiment, the positioning module 11 is specifically further configured to:

perform similarity transformation for the first target word obtained by the obtaining module 10 to obtain the third target word, wherein a proportion of an editing distance between the third target word and the first target word to a maximum editing distance of the first target word is smaller than or equal to a preset editing distance proportion threshold;

look up the to-be-corrected text for the third target word according to the defining parameters obtained by the obtaining module 10;

if the third target word is found, determine that the amendment source is positioned, and return position information of the amendment source.

Further optionally, in the amendment source-positioning apparatus in the present embodiment, the positioning module 11 is specifically further configured to, if the amendment source is not positioned in text fuzzy positioning, perform phonetic notation fuzzy positioning for the first target word obtained by the obtaining module 10 from the to-be-corrected text according to the defining parameters obtained by the obtaining module 10.

Further optionally, in the amendment source-positioning apparatus in the present embodiment, the positioning module 11 is specifically further configured to, perform real phonetic notation for each character in the first target word obtained by the obtaining module 10;

expand confusing phonetic notation for characters with confusing pronunciation, according to real phonetic notation of characters in the first target word;

generate a corresponding phonetic notation set of the characters, according to the real phonetic notation and confusing phonetic notation of respective characters in the first target word;

look up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;

if the first suspicious target word is found, determine that the amendment source is positioned, and return position information of the amendment source;

otherwise, further look up the to-be-corrected text for a second suspicious target word in order of the characters in the first target word according to the defining parameters obtained by the obtaining module 10, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold;

if the second suspicious target word is found, determine that the amendment source is positioned, and return position information of the amendment source.

Figure 7:
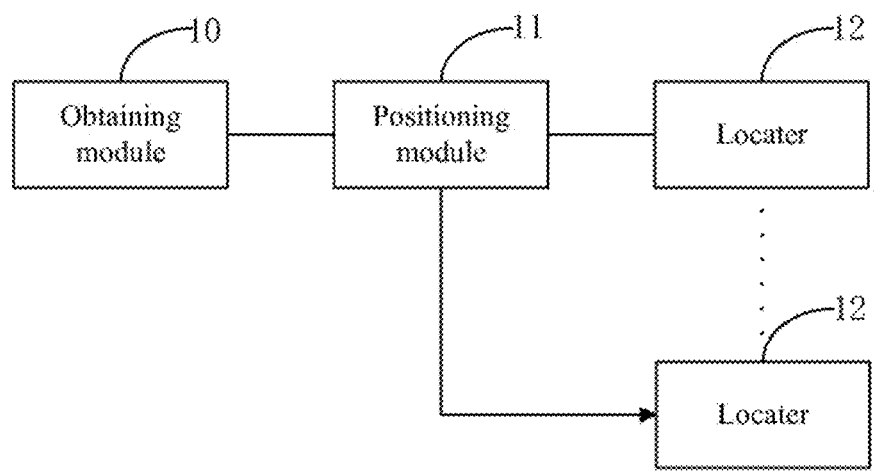
FIG. 7 is a structural diagram of a second embodiment of an amendment source-positioning apparatus according to the present disclosure.

FIG. 7 is a structural diagram of a second embodiment of an amendment source-positioning apparatus according to the present disclosure. As shown in FIG. 7, the amendment source-positioning apparatus of the present embodiment, on the basis of the technical solution of the embodiment shown in FIG. 6, may further comprise at least two locaters 12. The locaters 12 may correspond to parameter classes included by the defining parameters of the amendment source.

The defining parameters of the amendment source in the present embodiment include at least one parameter class among actual position, relative position, coverage scope, relative position-associated word and descriptive word; at least two locaters may be arranged to respectively correspond to certain parameter class combinations, for example, different combinations of five parameter classes may correspond to 32 locaters. For particulars, please refer to the depictions of the aforesaid relevant embodiments, and no detailed depictions will be presented here.

Furthermore, at this time, the positioning module 11 is specifically configured to obtain a corresponding locater 12 according to parameter classes included by the defining parameters; send the first target word and the defining parameters obtained by the obtaining module 10 to the corresponding locater 12, the locater 12 positioning the amendment source from the to-be-corrected text according to the first target word and the defining parameters. At this time, the positioning module 11 has a distribution function without performing specific amendment source positioning, and instead, the locater 12 performs amendment source positioning. Regarding a manner of the locater 12 positioning the amendment source from the to-be-corrected text according to the first target word and defining parameters, please refer to the manner of the positioning module 11 positioning the amendment source from the to-be-corrected text according to the first target word and defining parameters. No details are repeated any more here.

Figure 8:
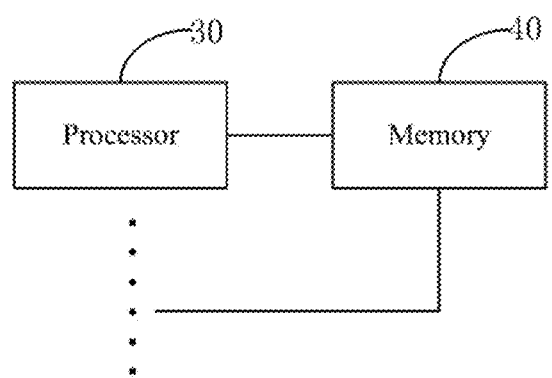
FIG. 8 is a structural diagram of an embodiment of a computer device according to the present disclosure.

FIG. 8 is a structural diagram of an embodiment of a computer device according to the present disclosure. As shown in FIG. 8, the computer device according to the present embodiment comprises: one or more processors 30, and a memory 40 for storing one or more programs, the one or more programs stored in the memory 40, when executed by said one or more processors 30, enabling said one or more processors 30 to implement the amendment source-positioning method of the embodiments as shown in FIG. 1-FIG. 7. The embodiment shown in FIG. 8 exemplarily includes a plurality of processors 30.

Figure 9:
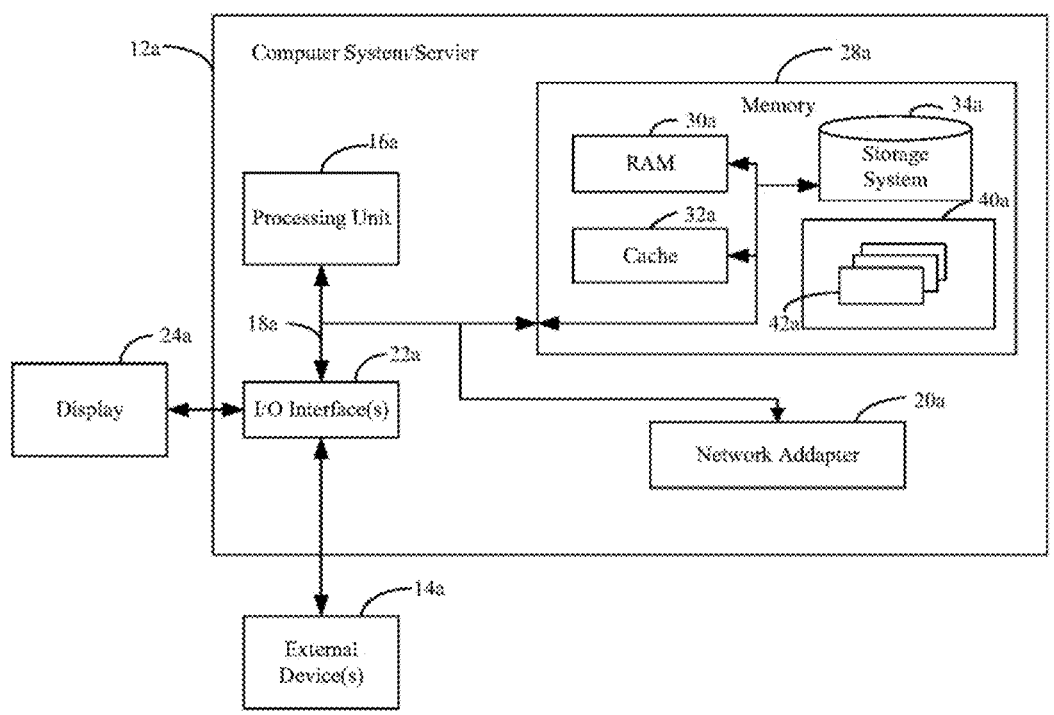
FIG. 9 is an example diagram of a computer device according to the present disclosure.

For example, FIG. 9 is an example diagram of a computer device according to the present disclosure. FIG. 9 shows a block diagram of an example computer device 12a adapted to implement an implementation mode of the present disclosure. The computer device 12a shown in FIG. 9 is only an example and should not bring about any limitation to the function and scope of use of the embodiments of the present disclosure.

As shown in FIG. 9, the computer device 12a is shown in the form of a general-purpose computing device. The components of computer device 12a may include, but are not limited to, one or more processors 16a, a system memory 28a, and a bus 18a that couples various system components including the system memory 28a and the processors 16a.

Bus 18a represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer device 12a typically includes a variety of computer system readable media. Such media may be any available media that is accessible by computer device 12a, and it includes both volatile and non-volatile media, removable and non-removable media.

The system memory 28a can include computer system readable media in the form of volatile memory, such as random access memory (RAM) 30a and/or cache memory 32a. Computer device 12a may further include other removable/non-removable, volatile/non-volatile computer system storage media. By way of example only, storage system 34a can be provided for reading from and writing to a non-removable, non-volatile magnetic media (not shown in FIG. 9 and typically called a "hard drive"). Although not shown in FIG. 9, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18a by one or more data media interfaces. The system memory 28a may include at least one program product having a set (e.g., at least one) of program modules that are configured to carry out the functions of embodiments shown in FIG. 1-FIG. 7 of the present disclosure.

Program/utility 40a, having a set (at least one) of program modules 42a, may be stored in the system memory 28a by way of example, and not limitation, as well as an operating system, one or more disclosure programs, other program modules, and program data. Each of these examples or a certain combination thereof might include an implementation of a networking environment. Program modules 42a generally carry out the functions and/or methodologies of embodiments shown in FIG. 1-FIG. 7 of the present disclosure.

Computer device 12a may also communicate with one or more external devices 14a such as a keyboard, a pointing device, a display 24a, etc.; with one or more devices that enable a user to interact with computer device 12a; and/or with any devices (e.g., network card, modem, etc.) that enable computer device 12a to communicate with one or more other computing devices. Such communication can occur via Input/Output (I/O) interfaces 22a. Still yet, computer device 12a can communicate with one or more networks such as a local area network (LAN), a general wide area network (WAN), and/or a public network (e.g., the Internet) via network adapter 20a. As depicted in FIG. 9, network adapter 20a communicates with the other communication modules of computer device 12a via bus 18a. It should be understood that although not shown, other hardware and/or software modules could be used in conjunction with computer device 12a. Examples, include, but are not limited to: microcode, device drivers, redundant processing units, external disk drive arrays, RAID systems, tape drives, and data archival storage systems, etc.

The processor 16a executes various function applications and data processing by running programs stored in the system memory 28a, for example, implements the amendment source-positioning method shown in the above embodiments.

The present disclosure further provides a computer readable medium on which a computer program is stored, the program, when executed by a processor, implementing the amendment source-positioning method shown in the above embodiments.

The computer readable medium of the present embodiment may include RAM30a, and/or cache memory 32a and/or a storage system 34a in the system memory 28a in the embodiment shown in FIG. 9.

As science and technology develops, a propagation channel of the computer program is no longer limited to tangible medium, and it may also be directly downloaded from the network or obtained in other manners. Therefore, the computer readable medium in the present embodiment may include a tangible medium as well as an intangible medium.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed system, apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. An amendment source-positioning method, wherein the method comprises:
    obtaining a first target word identifying an amendment source and defining parameters of the amendment source, from semantic parsing information of a user-input speech error correction instruction; and
    positioning the amendment source from a to-be-corrected text according to the first target word and the defining parameters, specifically comprises:
        looking up the to-be-corrected text for the first target word according to the defining parameters;
        if the first target word is found, determining that the amendment source is positioned, and returning position information of the amendment source;
        if the first target word is not found from the to-be-corrected text, performing text fuzzy positioning for the first target word from the to-be-corrected text according to the defining parameters, specifically comprises:
            performing synonymy transformation for the first target word to obtain a second target word;

looking up the to-be-corrected text for the second target word according to the defining parameters;

if the second target word is found, determining that the amendment source is positioned, and returning position information of the amendment source; and if the amendment source is not positioned in text fuzzy positioning, performing phonetic notation fuzzy positioning for the first target word from the to-be-corrected text according to the defining parameters, specifically comprises:

performing real phonetic notation for each character in the first target word;

expanding confusing phonetic notation for characters with confusing pronunciation, according to the real phonetic notation of characters in the first target word;

generating a corresponding phonetic notation set of the characters, according to the real phonetic notation and confusing phonetic notation of respective characters in the first target word;

looking up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;

if the first suspicious target word is found, determining that the amendment source is positioned, and returning position information of the amendment source;

otherwise, further looking up the to-be-corrected text for a second suspicious target word in order of the characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold; and if the second suspicious target word is found, determining that the amendment source is positioned, and returning position information of the amendment source, wherein the defining parameters comprise at least one parameter class among actual position, relative position, coverage scope, relative position-associated word and descriptive word; and the positioning the amendment source from a to-be-corrected text according to the first target word and the defining parameters further comprises:

obtaining a corresponding locater according to parameter classes included by the defining parameters; and sending the first target word and the defining parameters to the locater, the locater positioning the amendment source from the to-be-corrected text according to the first target word and the defining parameters.

2. The method according to claim 1, wherein the performing text fuzzy positioning for the first target word from the to-be-corrected text according to the defining parameters specifically comprises:

performing similarity transformation for the first target word to obtain a third target word, wherein a proportion of an editing distance between the third target word and the first target word to a maximum editing distance of the first target word is smaller than or equal to a preset editing distance proportion threshold;

looking up the to-be-corrected text for the third target word according to the defining parameters; and if the third target word is found, determining that the amendment source is positioned, and returning position information of the amendment source.

3. A computer device, wherein the device comprises:

one or more processors, a memory for storing one or more programs, the one or more programs, when executed by said one or more processors, enabling said one or more processors to implement the following operation:

obtaining a first target word identifying an amendment source and defining parameters of the amendment source, from semantic parsing information of a user-input speech error correction instruction; and positioning the amendment source from a to-be-corrected text according to the first target word and the defining parameters, specifically comprises:

looking up the to-be-corrected text for the first target word according to the defining parameters;

if the first target word is found, determining that the amendment source is positioned, and returning position information of the amendment source;

if the first target word is not found from the to-be-corrected text, performing text fuzzy positioning for the first target word from the to-be-corrected text according to the defining parameters, specifically comprises:

performing similarity transformation for the first target word to obtain a third target word, wherein a proportion of an editing distance between the third target word and the first target word to a maximum editing distance of the first target word is smaller than or equal to a preset editing distance proportion threshold;

looking up the to-be-corrected text for the third target word according to the defining parameters; and if the third target word is found, determining that the amendment source is positioned, and returning position information of the amendment source, wherein the defining parameters comprise at least one parameter class among actual position, relative position, coverage scope, relative position-associated word and descriptive word; and the positioning the amendment source from a to-be-corrected text according to the first target word and the defining parameters specifically comprises:

obtaining a corresponding locater according to parameter classes included by the defining parameters; and sending the first target word and the defining parameters to the locater, the locater positioning the amendment source from the to-be-corrected text according to the first target word and the defining parameters.

4. The computer device according to claim 3, wherein the performing text fuzzy positioning for the first target word from the to-be-corrected text according to the defining parameters specifically comprises:
   performing synonymy transformation for the first target word to obtain a second target word;
   looking up the to-be-corrected text for the second target word according to the defining parameters; and
   if the second target word is found, determining that the amendment source is positioned, and returning position information of the amendment source.

5. The computer device according to claim 4, wherein the operation further comprises:
   if the amendment source is not positioned in text fuzzy positioning, performing phonetic notation fuzzy positioning for the first target word from the to-be-corrected text according to the defining parameters.

6. The computer device according to claim 5, wherein the performing phonetic notation fuzzy positioning for the first target word from the to-be-corrected text according to the defining parameters specifically comprises:
   performing real phonetic notation for each character in the first target word;
   expanding confusing phonetic notation for characters with confusing pronunciation, according to the real phonetic notation of characters in the first target word;
   generating a corresponding phonetic notation set of the characters, according to the real phonetic notation and confusing phonetic notation of respective characters in the first target word;
   looking up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;
   if the first suspicious target word is found, determining that the amendment source is positioned, and returning position information of the amendment source;
   otherwise, further looking up the to-be-corrected text for a second suspicious target word in order of the characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold; and
   if the second suspicious target word is found, determining that the amendment source is positioned, and returning position information of the amendment source.

7. A non-transitory computer readable medium on which a computer program is stored, wherein the program, when executed by a processor, implements the following operation:
   obtaining a first target word identifying an amendment source and defining parameters of the amendment source, from semantic parsing information of a user-input speech error correction instruction;
   positioning the amendment source from a to-be-corrected text according to the first target word and the defining parameters, specifically comprises:
      looking up the to-be-corrected text for the first target word according to the defining parameters;
      if the first target word is found, determining that the amendment source is positioned, and returning position information of the amendment source;
      if the first target word is not found from the to-be-corrected text, performing text fuzzy positioning for the first target word from the to-be-corrected text according to the defining parameters, specifically comprises:
         performing synonymy transformation for the first target word to obtain a second target word;
         looking up the to-be-corrected text for the second target word according to the defining parameters;
         if the second target word is found, determining that the amendment source is positioned, and returning position information of the amendment source;
         if the amendment source is not positioned in text fuzzy positioning, performing phonetic notation fuzzy positioning for the first target word from the to-be-corrected text according to the defining parameters, specifically comprises:
            performing real phonetic notation for each character in the first target word;
            expanding confusing phonetic notation for characters with confusing pronunciation, according to the real phonetic notation of characters in the first target word;
            generating a corresponding phonetic notation set of the characters, according to the real phonetic notation and confusing phonetic notation of respective characters in the first target word;
            looking up the to-be-corrected text for a first suspicious target word in order of the characters in the first target word according to the defining parameters, wherein pronunciation of the characters in the first suspicious target word is matched in turn with the real phonetic notation or confusing phonetic notation in the phonetic notation set of the characters at corresponding positions in the first target word;
            if the first suspicious target word is found, determining that the amendment source is positioned, and returning position information of the amendment source;
            otherwise, further looking up the to-be-corrected text for a second suspicious target word in order of the characters in the first target word according to the defining parameters, wherein in the second suspicious target word, a proportion of the number of characters whose pronunciation is matched with the real phonetic notation or confusing phonetic notation in the phonetic notation set of characters at corresponding positions in the first target word to a total number of characters included by the first target word is larger than or equal to a preset character proportion threshold; and
            if the second suspicious target word is found, determining that the amendment source is positioned, and returning position information of the amendment source,
   wherein the defining parameters comprise at least one parameter class among actual position, relative position, coverage scope, relative position-associated word and descriptive word; and the positioning the amendment source from a to-be-corrected text according to the first target word and the defining parameters specifically comprises:
  obtaining a corresponding locater according to parameter classes included by the defining parameters; and
  sending the first target word and the defining parameters to the locater, the locater positioning the amendment source from the to-be-corrected text according to the first target word and the defining parameters.

8. The non-transitory computer readable medium according to claim 7, wherein the performing text fuzzy positioning for the first target word from the to-be-corrected text according to the defining parameters specifically comprises:
  performing similarity transformation for the first target word to obtain a third target word, wherein a proportion of an editing distance between the third target word and the first target word to a maximum editing distance of the first target word is smaller than or equal to a preset editing distance proportion threshold;
  looking up the to-be-corrected text for the third target word according to the defining parameters; and
  if the third target word is found, determining that the amendment source is positioned, and returning position information of the amendment source.

9. The non-transitory computer readable medium according to claim 7, wherein the defining parameters comprise at least one parameter class among actual position, relative position, coverage scope, relative position-associated word and descriptive word;
  furthermore, the positioning the amendment source from a to-be-corrected text according to the first target word and the defining parameters specifically comprises:
  obtaining a corresponding locater according to parameter classes included by the defining parameters; and
  sending the first target word and the defining parameters to the locater, the locater positioning the amendment source from the to-be-corrected text according to the first target word and the defining parameters.

* * * * *